(No Model.) 3 Sheets—Sheet 1.
P. D. VAN VRADENBURG.
CAR BRAKE AND STARTER.
No. 486,140. Patented Nov. 15, 1892.
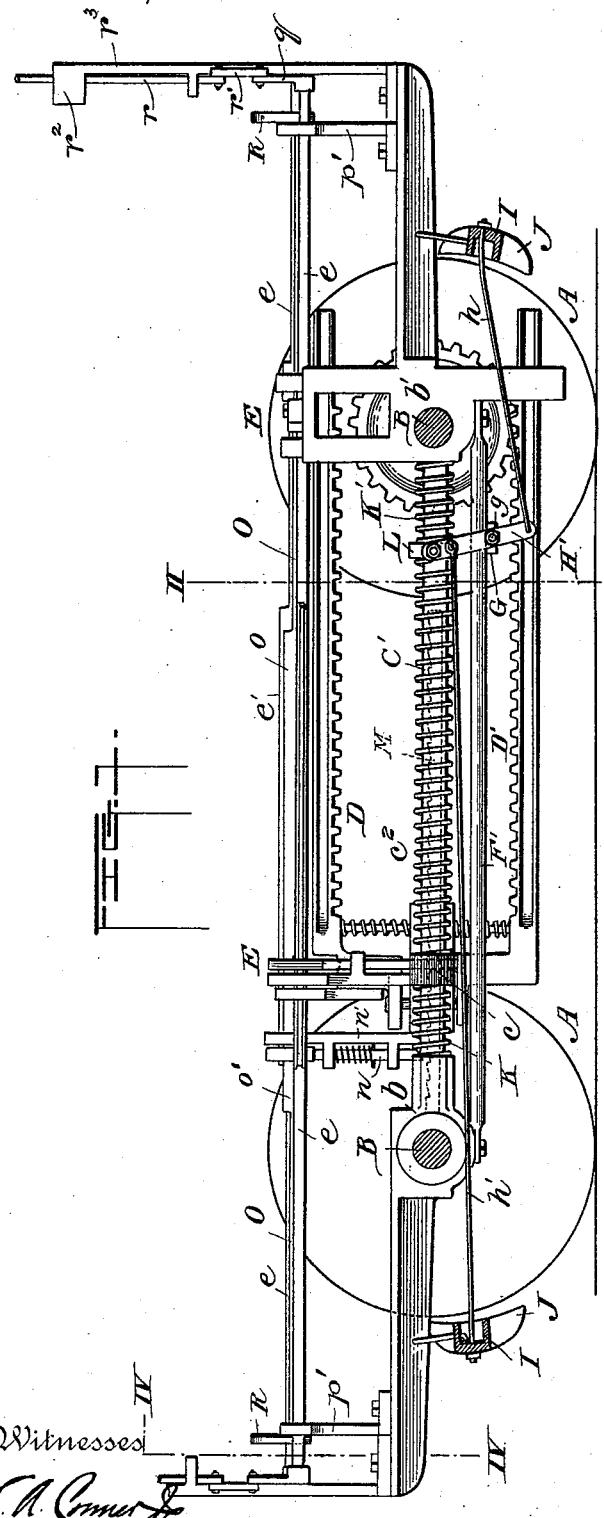
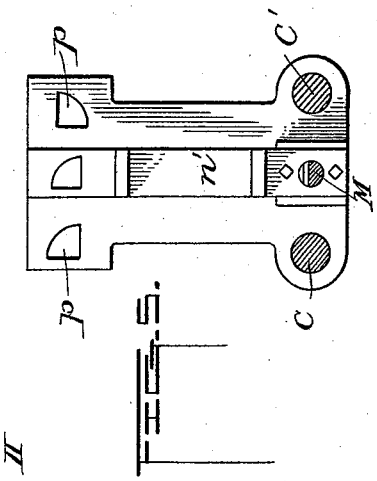
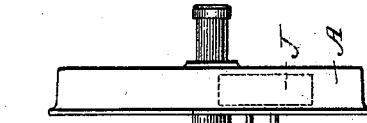
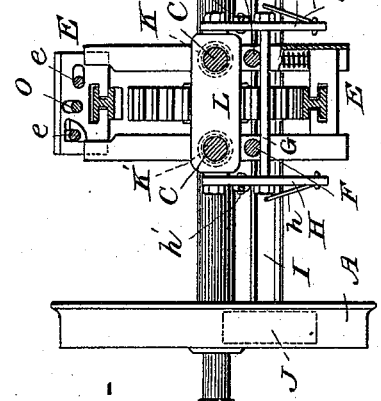
Witnesses
Inventor
P. D. Van Vradenburg
per
Attorneys.

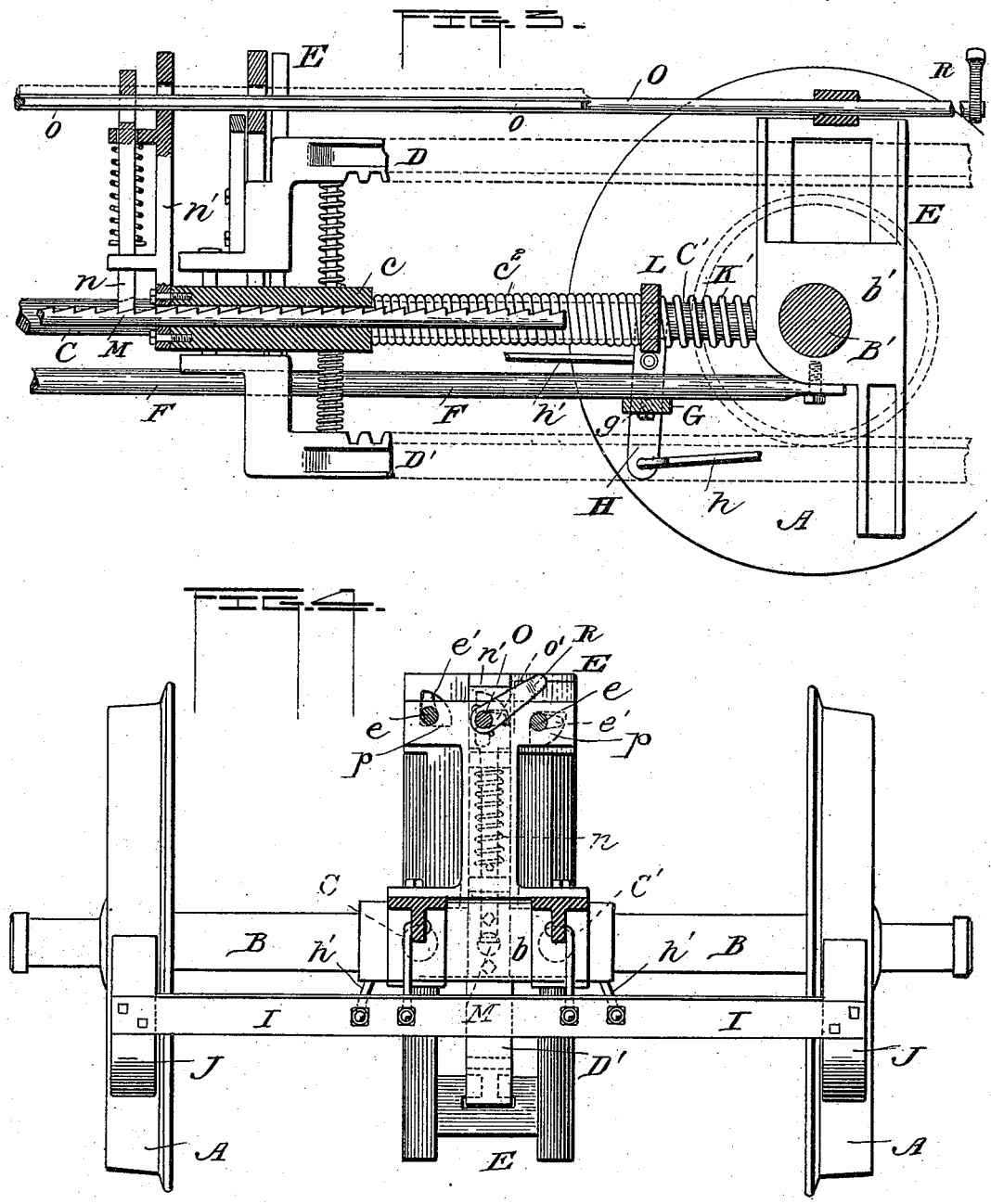

(No Model.)  P. D. VAN VRADENBURG.  3 Sheets—Sheet 3.
CAR BRAKE AND STARTER.
No. 486,140.  Patented Nov. 15, 1892.
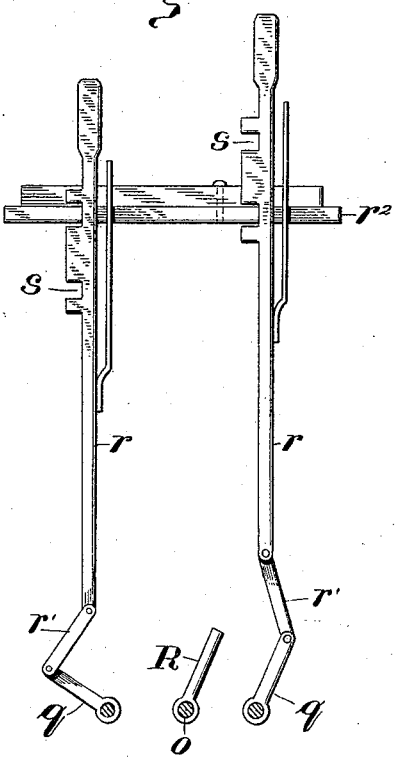
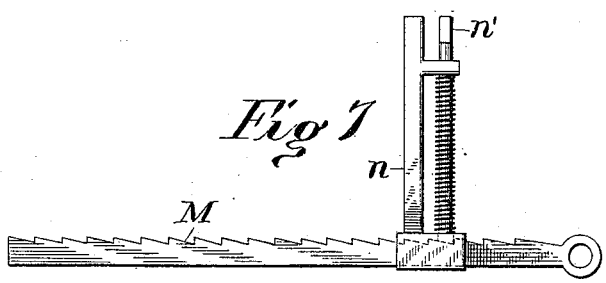

UNITED STATES PATENT OFFICE.

PETER D. VAN VRADENBURG, OF BINGHAMTON, NEW YORK.

CAR BRAKE AND STARTER.

SPECIFICATION forming part of Letters Patent No. 486,140, dated November 15, 1892.

Application filed February 20, 1892. Serial No. 422,287. (No model.)

*To all whom it may concern:*

Be it known that I, PETER D. VAN VRADENBURG, a citizen of the United States, residing at Binghamton, in the county of Broome and State of New York, have invented certain new and useful Improvements in Mechanism for Starting and Stopping Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements upon my prior patent, No. 463,959, and on the mechanism shown and described in my copending application bearing Serial No. 404,029, filed August 28, 1891, wherein rock-shafts extending under the car are employed to raise and lower cog bars or racks to throw them in and out of gear with a pinion fixed to rotate with the wheel-axle and retractile springs, the compression and release of which starts and stops the vehicle to which they are applied.

It is also proposed in my present invention to utilize these features and to employ in combination therewith means for applying brakes to the tread of the wheels and other novel features, all of which will be more fully described hereinafter, and pointed out in the claims.

In the accompanying drawings, Figure 1 represents a side elevation, partly in section, of the running-gear of a car to which my improvements are applied; Fig. 2, a cross-section through line II of the preceding figure; Fig. 3, an enlarged view of one of the axles showing the position of parts when the brakes are set; Fig. 4, a cross-section through line IV IV of Fig. 1; Fig. 5, a detailed view of one of the supporting-frames of the rock-shafts; Fig. 6, a detailed view of the hand-levers for operating said shafts, and Fig. 7 views of details.

In the present instance my invention is shown applied to the running-gear of a street-car in which the reference-letter A denotes the wheels of the car, and B the axles fixed to the wheels in the ordinary manner. The axles are connected by means of rods C and C', secured to boxes $b\ b'$. Retractile springs $c^2$ encircle the rods. These rods almost support one end of the independent cog-bars D D' by means of a sliding carriage $c$, and are arranged to engage the top and bottom of a pinion fixed to the axle, as will more fully appear hereinafter.

Parallelism of the cog-bars is maintained by means of vertically-movable hangers E, from which the cog-bars are suspended, and the latter are thrown in and out of engagement with the pinion by means of rock-shafts $e$, provided with beads $e'$, which pass through quadrant-shaped openings $p$ in frame, Fig. 5, and L-shaped openings in the hangers. The ends of the shafts are supported in bearings $p'$, secured to extensions of the boxes $b\ b'$, and the shafts are rocked by cranks $q$, attached to vertically-movable handles $r$, connected therewith by links $r'$. These handles are held in engagement with a ledge $r^2$ (secured to standards arising from extensions of boxes $b\ b'$) by means of notches $s$ in the upper part of the handle. A leaf-spring holds the handles in engagement with the ledge, and has sufficient elasticity to permit them to be easily disengaged in the lowering and raising operation. Parallel to and preferably beneath the rods C C' are placed rods F F', which have their opposite extremities secured to boxes $b\ b'$. Near one end and near the axle carrying the gear is rigidly attached to the rods F F' a cross-bar G, having pivots $g$, on which the brake-actuating levers H and H' are fulcrumed. The upper and lower arms of these levers are pin-joined or otherwise attached to rods $h\ h'$, in turn connected to brake-beams I, which beams are suspended from extensions of the axle-boxes and are provided with brake-shoes J. Between the sliding carriage $c$ and box $b$ is placed a cushion-spring K to receive the shock of the released springs $c^2$. A runner L, having its opposite ends attached to the levers H H', slides on rods C C' and is interposed between the springs $c^2$ and small springs K'. These small springs serve to actuate the levers and release the brakes upon the expansion of the large springs, and thereby hold the brakes in released adjustment until they (the small springs) are overcome by the pressure of the larger ones. In order to lock the large retractile springs $c^2$ in compressed position, a pawl-and-ratchet mechanism is provided, and this consists of a horizontal ratchet-bar M, secured to the axle B between the rods C C'.

The spring-pawl $n$ is carried in an open frame $n'$ on the carriage $c$. This pawl engages the ratchet-bar M and locks the carriage against the expansion of the retractile springs. The pawl is released by means of a horizontal rock-shaft O, similar to those for actuating the hangers E, it being provided with a bead O', operating within an L-shaped opening P in the upper end of the pawl. The opposite extremities of the rod O are provided with cranks R, which extend up through the platform of the car in a position convenient to be operated by the foot of the driver.

A more detailed description of the mechanism employed for actuating the cog-bars and their hangers is not deemed necessary, as the principal part has been more carefully described in my co-pending application.

The operation is as follows: When it is desired to accumulate power for starting the car, one of the cog-bars being in engagement with the pinion which is attached to one of the axles, the movement of the vehicle causes the sliding carriage $c$, to which the cog-bars are attached, to compress the retractile springs. As soon as said springs have been compressed enough they will overcome the tension of the buffer-springs K', and the brake-rods will be operated through the runner L, which causes the levers H and H' to move the brake-rods and apply the brake-shoes. The spring pawl or dog having been previously depressed, the retractile springs and the brakes will remain locked until the driver elevates the said pawl or dog with his feet, when said springs will expand until the normal state of the various parts is resumed. Just prior to the termination of the expansion of the large springs $c^2$ the carriage is arrested by the cushion-springs K', thereby preventing sudden shocks to the mechanism in case the cog-bars should be disengaged from the pinion when released.

Having thus described my invention, what I claim, and desire to secure by Letters Patent, is—

1. A brake mechanism having opposing springs of unequal power, substantially as described.

2. A brake mechanism having opposing springs of unequal power, in combination with an automatic locking device, substantially as set forth.

3. A brake mechanism having opposing springs of unequal power, in combination with a ratchet-bar, a detent pawl or dog adapted to engage said ratchet-bar, and mechanism, as described, for throwing said detent into and out of engagement.

4. A brake mechanism having opposing springs of unequal power, in combination with a ratchet-bar, a detent pawl or dog adapted to engage said ratchet-bar, and a rock-shaft provided with a bead, whereby said detent pawl or dog is thrown into or out of engagement with the ratchet-bar, substantially as set forth.

5. In a vehicle-brake mechanism, the combination, with the axle, of a supporting-frame secured thereto, opposing springs, a cross-bar adapted to be controlled by said springs, and levers mounted upon said supporting-frame and attached at one end to the cross-bar, whereby the brakes are operated as set forth.

6. In vehicle-brake mechanism, the combination, with the axles, of a supporting-frame secured thereto, opposing springs, a cross-bar adapted to be controlled by said springs, levers mounted upon said supporting-frame and attached at one end to the cross-bar, whereby the brakes are operated, a ratchet-bar, and a detent pawl or dog adapted to lock said bar and set the brakes, as described.

7. In a vehicle-brake mechanism, the combination, with the axles, of a supporting-frame secured thereto, opposing springs, a cross-bar adapted to be controlled by said springs, levers mounted upon said supporting-frame and attached at one end to the cross-bar, whereby the brakes are operated, a ratchet-bar, a detent pawl or dog adapted to engage said ratchet-bar, and a rock-bar provided with a bead, whereby said detent pawl or dog is thrown into and out of engagement with said ratchet-bar, substantially as and for the purpose set forth.

8. The herein-described starting and stopping mechanism, consisting of the combination of a pair of rack-bars, a pinion secured to the vehicle-axle and adapted to engage the bars, and brake-levers attached to compressible springs arranged to simultaneously store up power and apply the brakes, in the manner and for the purpose specified.

9. In combination with the herein-described starting-springs and their mechanism, a brake-lever actuated by said springs, whereby the starting energy is stored simultaneously with the braking operation, substantially as described.

In testimony whereof I affix my signature in presence of two witnesses.

PETER D. VAN VRADENBURG.

Witnesses:
J. A. BROWN,
GRACE L. PEEBLES.